United States Patent Office.

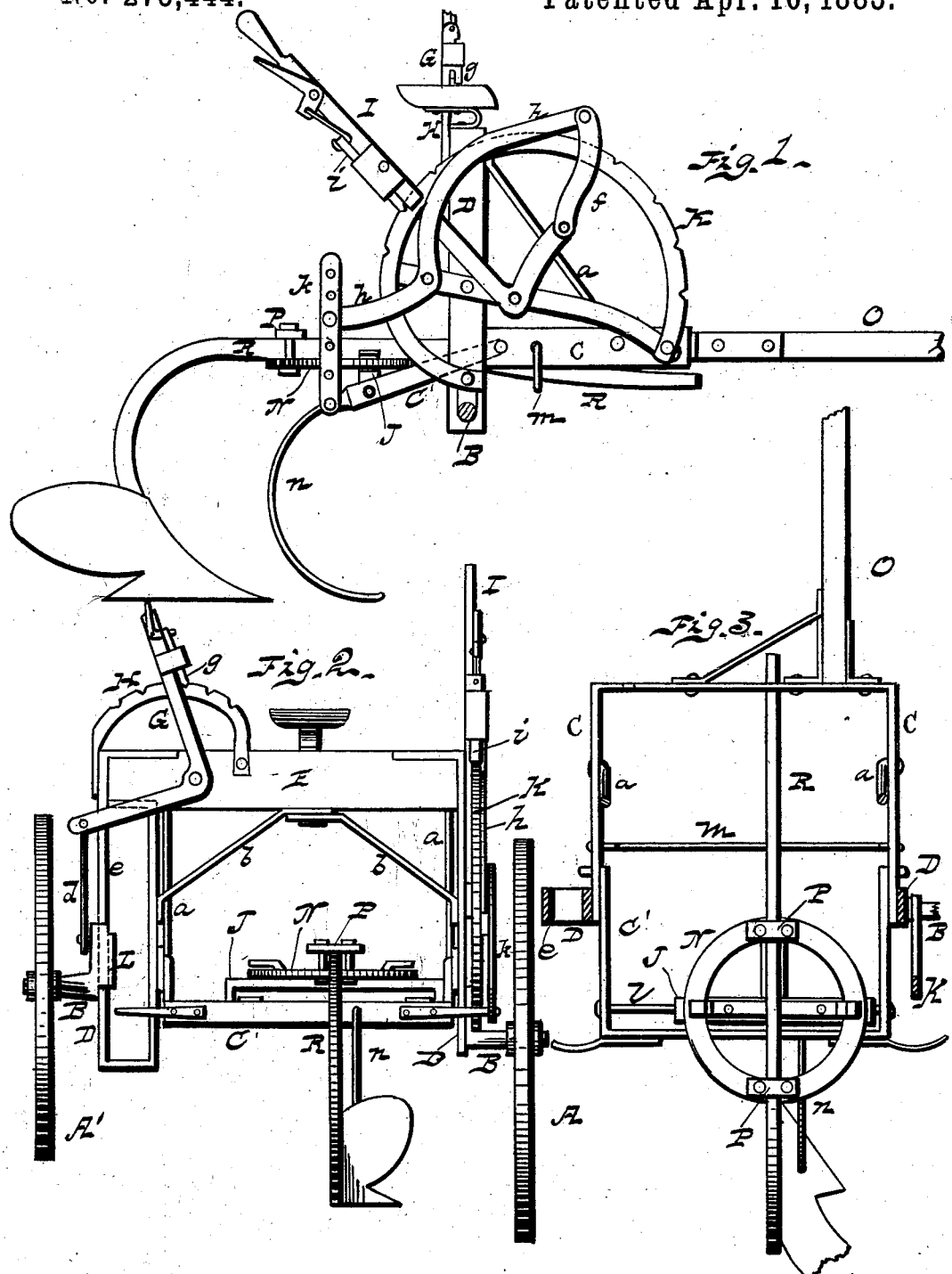

GEORGE WELIVER, OF CASS COUNTY, MISSOURI.

SULKY-PLOW ATTACHMENT.

SPECIFICATION forming part of Letters Patent No. 275,444, dated April 10, 1883.

Application filed October 13, 1882. (No model.)

*To all whom it may concern:*

Be it known that I, GEO. WELIVER, a citizen of the United States, residing north of Belton, in the county of Cass and State of Missouri, have invented certain new and useful Improvements in Sulky-Plow Attachments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to sulky or wheel plows; and it consists in an improved construction and arrangement of the lifting and adjusting devices, whereby the plow and land-wheel are raised, lowered, adjusted, and carried while at work in better manner than hitherto done, as will be hereinafter more clearly shown, described, and claimed.

In the drawings, in which similar parts in the several figures are represented by the same letters, Figure 1 is a side elevation with the wheels removed, showing the position of the plow-lifting device when the plow is in the ground. Fig. 2 is a rear view of the same, and Fig. 3 is a horizontal sectional view.

A is the furrow-wheel, and A' the land-wheel, revolving on the journals of the short axles B, which are secured to the lower ends of the uprights D of the frame. The frame consists of a bar of iron or other suitable material, C, bent at right angles at either end, forming elbows, and placed horizontally, to which are securely attached the uprights D, which support the cross-bar E, carrying the driver's seat and the lifting device for the land-wheel A', and to the lower ends of which uprights are attached the short axles B. Braces *a a b b* strengthen and additionally support the cross-bar E. The upright D on the land-side is bent at right angles parallel to and at a little distance from itself, and carried up to and connected with the cross-bar E, to form a slide, *e*, on which the land-wheel rises and falls, its motion being controlled by the lever G, working on the segmental rack or ratchet plate H, in which the dog or pawl *g* engages. Attached to the opposite side of the frame C is another lever, I, having a pawl or catch, *i*, engaging with the ratchet K, which lever raises and lowers the bail and plow-beam and plow.

C' is the bail, carrying the supplemental bail J, fifth-wheel N, and the beam R, said bail having its ends pivoted in the frame C, so as to admit of a vertical movement to raise or lower the plow and beam.

The axle of the wheel A' has a sleeve, L, bent upward at right angles into an elbow and hollowed to play on the slide *e*, and said elbow is connected by a rod, *d*, with the bent end of the lever G, which raises and lowers the wheel A' in passing over rough ground or obstructions, so that the plow may be maintained at uniform depth in the ground.

The plow-beam is attached to a fifth-wheel, N, so that it can be changed from side to side without any side draft on the tongue or horses' necks. The fifth-wheel is pivoted to the bail, so as to have a motion independent of the frame C or of the tongue. On the top of the fifth-wheel are open loops or clips P of sufficient size to receive and securely hold the beam of a plow of any size, whether the same be constructed of wood or iron. The supplemental bail is an iron rod, J, bent at right angles at its extremities and turning on a rod, *l*, mounted in the bail C'. The bail C' has its ends pivoted in openings in the said frame C, so that the bail with the plow-beam and plow may be raised and lowered at will, its motion being controlled by the lever I, to which it is attached by the link *f*, arm *h*, and upright *k*, the latter having a series of openings to receive a pivot-pin, so that the elevation of the plow-beam can be increased or diminished at pleasure. Extending across the rear of the bail is a rod, *l*, on which the fifth-wheel N is secured, so that it can be moved from side to side when desired to be changed from a right to a left hand plow, and a cross-bar, *m*, in front prevents the beam falling forward, and at each side of the rear of the bail are openings to receive a hook, *n*, which projects in front of the plow for the purpose of pulling grass, weeds, &c., into the furrow to be covered.

The tongue O is arranged to be attached to either side of the front of the frame C, as designed to be used as a right or left hand plow. The levers G and I, being within easy reach of the driver, can be operated without dismounting from his seat or stopping the horses, and the depth which the plow enters the ground will always be the same, no matter what is the inequality of the surface or the obstructions encountered, as the driver can raise or lower the plow or the land-wheel at will.

I am aware that sulky-plows having levers to raise and lower the plow-beam and plow are not new. Therefore I do not broadly claim such devices; but What I do claim as new and useful and of my invention, and desire to secure by Letters Patent, is—

In a sulky or wheel plow, the combination, with the frame C, of the bail C', supplemental bail J, fifth-wheel N, provided with clips P, compound lever I, and ratchet K, arranged and operating as herein described, and for the purpose set forth.

In testimony whereof I affix my signature in presence of two witnesses.

GEORGE $\overset{\text{his}}{+}$ WELIVER.
mark.

Witnesses:
C. M. WILLIAMS,
G. W. WASKOM.